Jan. 28, 1930.
H. W. SNYDER
1,745,125
TRY COCK CONSTRUCTION
Filed Sept. 24, 1927
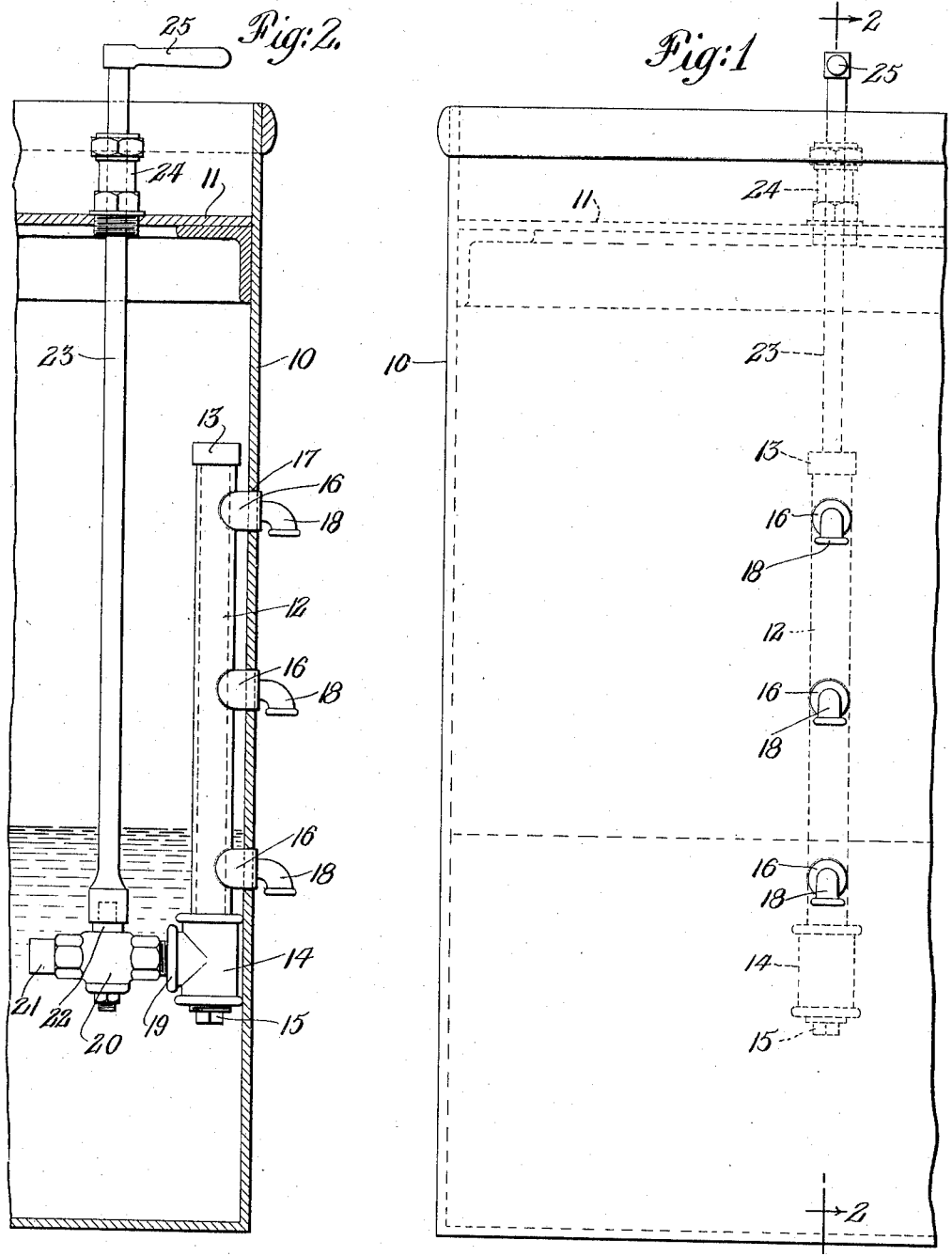
INVENTOR
Herbert W. Snyder
BY
Synnestvedt + Lechner
ATTORNEYS Patented Jan. 28, 1930

1,745,125

UNITED STATES PATENT OFFICE

HERBERT W. SNYDER, OF LIMA, OHIO

TRY-COCK CONSTRUCTION

Application filed September 24, 1927. Serial No. 221,697.

This invention relates to apparatus for determining the level of liquid in a tank and more particularly to a locomotive tender tank try cock construction for indicating the water level therein.

Heretofore the common practice for determining the approximate level of water in a tender tank has been to employ ordinary types of try cocks located at various levels on the outside of the tank, usually at the front end thereof, each of these cocks being provided with an individual operating device also located on the outside of the tank. This usual arrangement of try cocks located on the outside of the tank has been objectionable for several reasons, one of which is that in cold weather the several cocks become frozen and cannot be operated to permit the discharge of water therethrough. Further, due to the fact that each of the cocks is arranged to be individually operated, it becomes necessary, in order to determine the approximate water level in the tank, to open and close each one separately.

This invention aims to obviate the aforementioned objections by providing a try cock arrangement which is not subject to freezing, and, further, wherein all of the cocks, irrespective of their number, are operable simultaneously to facilitate the ascertaining of the liquid level in the tank.

More specifically, the invention contemplates the provision of an arrangement for quickly determining the water level in a tank wherein a plurality of outlets are associated with a common pipe or conduit located within the tank.

A still further object of the invention is the provision of a plurality of vertically spaced try cock outlets, each of which directly communicates with a pipe located within the water tank, the latter being provided with means for controlling the passage of water into said pipe and out through one or more of said outlets depending upon the depth of the water in the tank.

Other objects and advantages relating to simplicity of operation and economy in construction, as, for example, the provision of a single operating mechanism of simple and rugged construction for controlling the passage of water through one or more of the several try cocks, will appear more fully hereinafter. A preferred embodiment of the invention is described in the following specification and shown in the accompanying drawings, in which drawings:

Figure 1 is a partial elevation of one end of a tank wherein is located the device embodying the principles of this invention; and Figure 2 is a vertical section through a portion of the tank taken on the line 2—2 of Figure 1.

Referring more particularly to the drawings, the reference numeral 10 designates generally a water or tender tank of usual construction and provided with a top cover plate 11 supported in position in any desired manner. Located within the tank 10, and preferably adjacent one end wall thereof, is a pipe or conduit 12, the upper end of which is closed by a suitable cap or similar member 13. The lower end of the pipe 12 is provided with a T fitting 14, within the lower end of which is threaded a plug 15. This plug 15 is removable in order to provide access to the interior of the pipe 12 when it is desired to clean said pipe of any accumulated sediment and the like.

Extending laterally from the pipe 12 are a plurality of vertically spaced manifold connections 16, the inner ends of said manifold connections being in direct communication with the interior of the pipe 12, while the outer ends thereof project through suitably provided openings 17 in the adjacent wall of the tank 10. The members 16 are preferably welded both to the pipe 12 and to the wall of the tank. Threaded into, or otherwise suitably connected to, the outwardly projecting ends of these manifold connections are a plurality of L members 18, these latter being arranged with their outer ends extending downwardly, as appears most clearly in Figure 2. While the drawings illustrate the use of three such L's, it is to be understood, of course, that a greater or lesser number may be employed, depending upon the degree of accuracy with which it is desired to determine the height of the water level in the tank. In any case the cross-sectional area of pipe 12 is made greater than the combined cross-sectional area of all the outlets, to insure the rising of the water in the pipe to the height of the tender water level.

Threaded into the laterally extending opening 19 of the T member 14 is a water valve 20 provided with the usual inlet port 21. The operating stem 22 of the valve 20 preferably extends upwardly and is provided with a vertically extending extension 23 projecting through the top cover plate 11 of the tank. An upper bearing member 24, preferably threaded into the cover plate 11, serves to maintain the valve stem extension 23 in alignment with the operating stem 22 of the valve. A handle 25 for operating the valve 20 is secured to the upper end of the valve stem extension 23. It will be seen that in the arrangement just described all of the several parts, with the exception of the outlet tips or L's 18 and the handle 25, are located within the tank 10, an important advantage resulting from this arrangement being that the valve 20, and all other parts ordinarily subject to freezing, are protected from the weather, thereby eliminating the possibility of freezing in cold weather.

The operation of the device will be readily apparent. Upon operating the handle 25 to open the valve 20, the water in the tank 10 is admitted into the upright pipe 12, the water in said pipe rising to the same height as the water level in the tank. Assuming that this water level is of a height equal to that shown in the drawings, the water in the tank will pass out of the lowermost try cock outlet 18, thus indicating that the water level is somewhere between said lowermost outlet and the one immediately above it. Should the tank be filled to the top, the water will pass out of all of the outlets simultaneously, thereby indicating at a glance the approximate height of the water level in the tank without necessitating the separate opening and closing of a number of try cocks, it being merely necessary to operate the single valve 20 by means of the handle 25.

As has been already indicated, a greater number of outlets or L's may be employed should it be desired to determine the water level in the tank within closer limits than is possible where only three such outlets are provided. In such case, it is merely necessary to make the upright pipe 12 and the valve 20 of sufficient size to take care of the greater number of such outlets.

It is to be understood, of course, that various changes or modifications might be made in the arrangement herein shown and described without departing from the spirit or scope of the invention, as indicated by the appended claims.

What I claim is:—

1. In combination with a liquid containing vessel, a liquid level indicator including a valve located near the bottom of the vessel and communcating with the liquid therein, and a series of spaced exterior outlets connected to the valve and located above the level thereof.

2. A tender try cock construction comprising, in combination, spaced outlets opening outside the tender, and submerged valve means therefor inside the tender.

3. A tender try cock construction comprising, in combination, spaced outlets opening outside the tender, and submerged valve means therefor inside the tender, together with valve control means operable from outside the tender.

4. A tender try cock construction comprising, in combination, spaced outlets opening outside the tender, and a common submerged valve means therefor inside the tender.

5. An apparatus for determining the level of a liquid in a tank comprising, in combination with a tank, a vertically extending pipe arranged therein, a plurality of outlets leading from said pipe to the exterior of said tank, and submerged valve means located within said tank for controlling the passage of liquid into said pipe.

6. An apparatus for determining the water level in a tank comprising, in combination with a tank, an upright pipe disposed therein, said pipe being sealed at its upper end and open at its lower end, a plurality of vertically spaced outlets for said pipe projecting outwardly of said tank, a submerged valve operable to open and close the opening at the lower end of said pipe, and means accessible from the exterior of said tank to operate said valve.

7. An apparatus for determining the liquid level in a tank comprising, in combination with a tank, a plurality of vertically spaced outlets projecting exteriorly of said tank and common control means submerged in the liquid for controlling simultaneously the passage of liquid by gravity through all of said outlets.

8. An apparatus for determining the liquid level in a tank comprising, in combination with a tank, a plurality of vertically spaced outlets projecting exteriorly of said tank, and common control means for controlling the passage of liquid through said outlets, said means being located within said tank at least as low as the lowest outlet.

9. Apparatus for indicating liquid level in a container, comprising a common conduit having a plurality of open outlets, and submerged valve means controlling admission of liquid to the conduit.

10. Apparatus for indicating liquid level in a container, comprising a common conduit having a plurality of open outlets, and submerged valve means controlling admission of liquid to the conduit, said conduit being of greater cross-sectional area than the combined area of the outlets.

11. Apparatus for indicating liquid level in a container, comprising a common conduit having a plurality of outlets, and submerged valve means controlling admission of liquid to the conduit, together with valve operating means, said outlets and said operating means being positioned to extend outside said container upon insertion of the apparatus therein.

12. In combination with a tank, a conduit therein, manifold connections secured to said conduit and tank and positioned at different heights, outlets from said connections, and submerged valve means for said conduit.

13. In combination with a tank, a conduit therein, manifold connections secured to said conduit and tank and positioned at different heights, outlets from said connections, and valve means for said conduit submerged in said tank.

14. In combination with a tank, a conduit therein, manifold connections secured to said conduit and tank and positioned at different heights, outlets from said connections, and submerged valve means for said conduit, together with valve operating means extending outside the tank.

In testimony whereof I have hereunto signed my name.

HERBERT W. SNYDER.